US008230757B2

(12) United States Patent
Nocko et al.

(10) Patent No.: US 8,230,757 B2
(45) Date of Patent: Jul. 31, 2012

(54) LEVER LOCKOUT ASSEMBLY

(75) Inventors: Magdalena Janina Nocko, Waterloo, IA (US); Dean Arden Boyce, Waterloo, IA (US); Christopher David Finck, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 1036 days.

(21) Appl. No.: 12/181,351

(22) Filed: Jul. 29, 2008

(65) Prior Publication Data

US 2010/0024588 A1 Feb. 4, 2010

(51) Int. Cl.
*G05G 5/08* (2006.01)
*G05G 5/06* (2006.01)
*G05G 9/047* (2006.01)
*B60K 20/00* (2006.01)

(52) U.S. Cl. ............. 74/473.25; 74/473.24; 74/471 XY; 74/473.33; 74/526; 74/527

(58) Field of Classification Search .. 74/473.21–473.26, 74/473.33, 471 XY, 523, 526–533
See application file for complete search history.

(56) References Cited

U.S. PATENT DOCUMENTS 3,626,780 A 1/1970 Lowder et al.
3,874,248 A * 4/1975 Hauser et al. .............. 74/473.26
4,119,186 A * 10/1978 Choudhury et al. .......... 477/113
4,371,063 A * 2/1983 Troemner et al. .......... 192/219.6
4,485,689 A * 12/1984 Cambria .................... 74/473.21
4,548,094 A 10/1985 Huitema et al.
5,458,021 A 10/1995 Wichelt et al.
5,499,553 A 3/1996 Schott et al.
5,727,426 A 3/1998 Lykken et al.
6,237,436 B1 * 5/2001 Dybro ........................ 74/473.25
6,338,288 B1 1/2002 Spadaccini et al.
6,886,677 B2 * 5/2005 Rupiper et al. ............ 192/219.6
2011/0072933 A1 * 3/2011 Boyce ............................ 74/532

OTHER PUBLICATIONS

Deere & Co., "Exhibit A", p. PY007251 from a parts catalog, date unkown but shows parts in production before the invention of the subject mater of this application, published in the US.
Deere & Co., "Exhibit B", p. RXP010201 from a parts catalog, date unkown but shows parts in production before the invention of the subject mater of this application, published in the US.

* cited by examiner

*Primary Examiner* — Vinh T. Luong

(57) ABSTRACT

A lever lockout assembly includes a pair of lever supports and a pair of slide supports mounted on a housing. A lever member is rotatably supported by the lever supports. The lever member has a pair of arms separated by a notch. A lockout slide is slidably supported by the slide supports. The lockout slide has a ridge portion and a recess portion. The lockout slide is slidable to a lockout position wherein the ridge portion is received by the notch and the ridge is engagable with the arms to prevent rotation of the lever member. The lockout slide is also slidable to an unlocked position wherein the recess portion is aligned with the notch and the arms are rotatable through the recess portion. A handle projects from an end of the lockout slide. The lockout slide is a rigid bar with a polygonal cross-sectional shape. An edge of the bar forming the ridge portion. The lockout slide includes a pair of detent recess formed in a surface thereof. A detent roller engages the lockout slide, and is releasably received by the detent recess to releasably hold the lockout slide in a selected positions.

14 Claims, 4 Drawing Sheets

LEVER LOCKOUT ASSEMBLY

FIELD OF THE INVENTION

The present invention relates to a lever lockout assembly.

BACKGROUND OF THE INVENTION

Tractors and other utility vehicles are typically equipped with control levers which control the operation of devices, such as selective control valves (SCV). In many markets regulations require mechanisms which can secure such levers in a neutral position, such as when the vehicle is in transport or when the SCV is not being used. Such a mechanism can prevent activation of the SCV as a result of accidental contact with the lever or as a result of vibration.

SUMMARY OF THE INVENTION

Accordingly, an object of this invention is to provide an effective lever lockout assembly.

This and other objects are achieved by the present invention, wherein a lever lockout assembly includes a pair of lever supports and a pair of slide supports mounted on a housing. Lever members are rotatably mounted on a shaft supported by the lever supports. Each lever member has a pair of arms separated by a notch. A lockout slide is slidably supported by the slide supports. The lockout slide has a ridge portion and a recess portion. The lockout slide is slidable to a lockout position wherein the ridge portion is received by the notch and the ridge is engagable with the arms to prevent rotation of each lever member. The lockout slide is also slidable to an unlocked position wherein the recess portion is aligned with the notch and the arms are rotatable through the recess portion. A handle projects from an end of the lockout slide. The lockout slide is a rigid bar with a polygonal cross-sectional shape. An edge of the bar forming the ridge portion. The lockout slide includes a pair of detent recess formed in a surface thereof. A detent roller engages the lockout slide, and is releasably received by the detent recess to releasably hold the lockout slide in a selected positions.

This lever lockout assembly design meets the selective control valve lockout homologation requirements. It enables the operator to lock or unlock all of the SCV levers in a console as well as all of the valve functions with a single motion, as compared to previous designs that required a lock for each single SCV lever. It accomplishes this with a minimal number of parts in a compact area using a sliding member. The components of the system have been designed to take advantage of unique features of adjacent parts. Another benefit of this feature is in the adjustment of the SCV levers and cables to the valve. After the cables are assembled to the valve and control levers, the levers can be locked to the neutral position. The cable length for each control can be adjusted to the proper length for the neutral position of the valve. After the adjustments are completed, the cable end locking clip is installed. This reduces the number of adjustment iterations required during initial assembly or service.

DESCRIPTION OF THE PREFERRED EMBODIMENT

Figure 1:
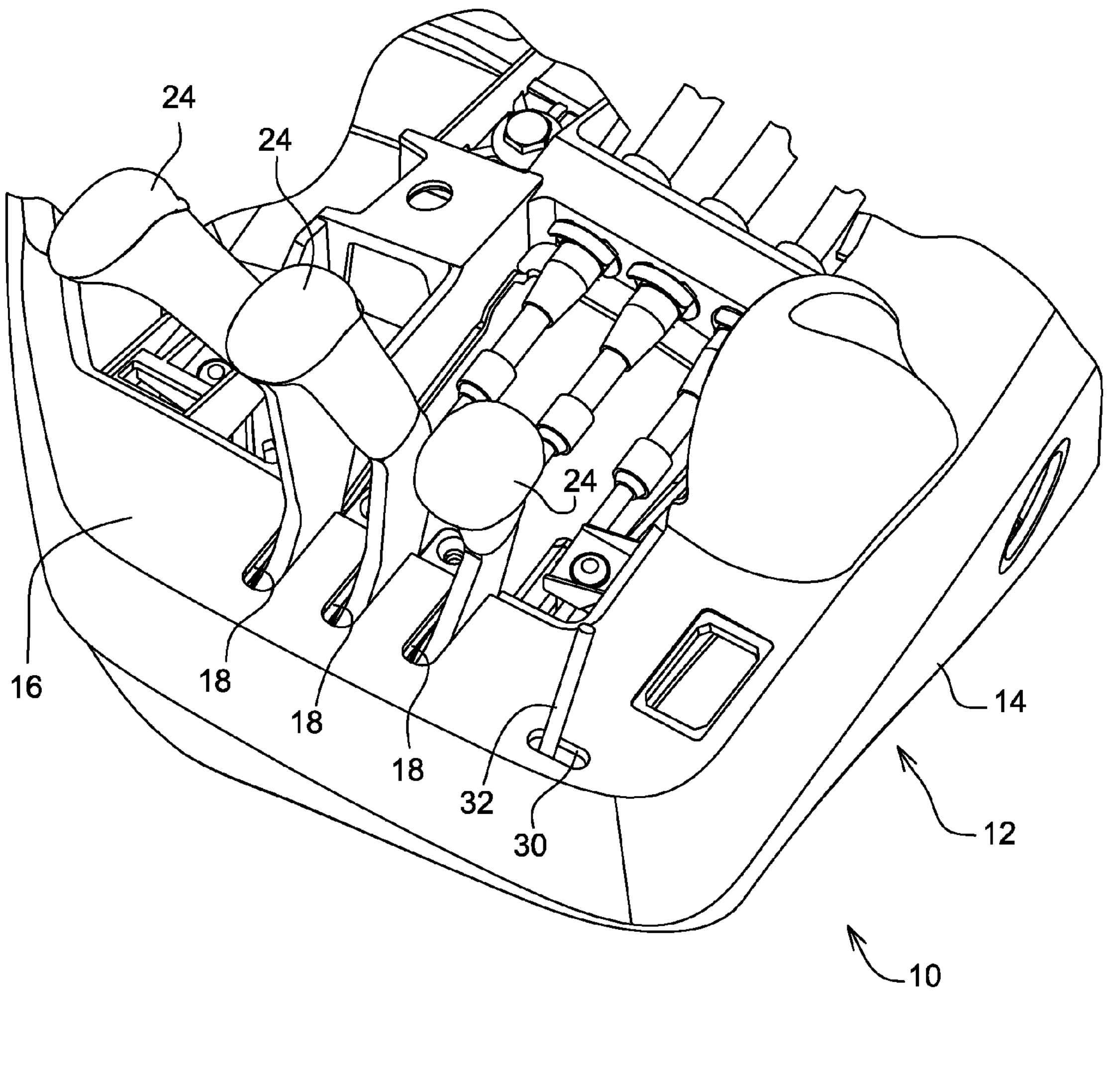
FIG. 1 is a top perspective view of a vehicle control console including the present invention.

Referring to FIG. 1, control console 10, for a vehicle (not shown) such as an agricultural tractor or utility vehicle, includes a housing 12 with a base or lower cover 14 and an upper cover 16. The cover 16 has a plurality of lever slots 18 through which project control levers 24. A lower part of each control lever 24 is preferably pivotally coupled by a pivot pin 23 to a conventional linkage 25 (see FIG. 4), which is in turn, operatively coupled to a controlled device, such as a conventional selective control valve (not shown). The cover 16 also has a lockout handle slot 30 though which extends a lockout handle 32 for manipulation by an operator.

Figure 2:
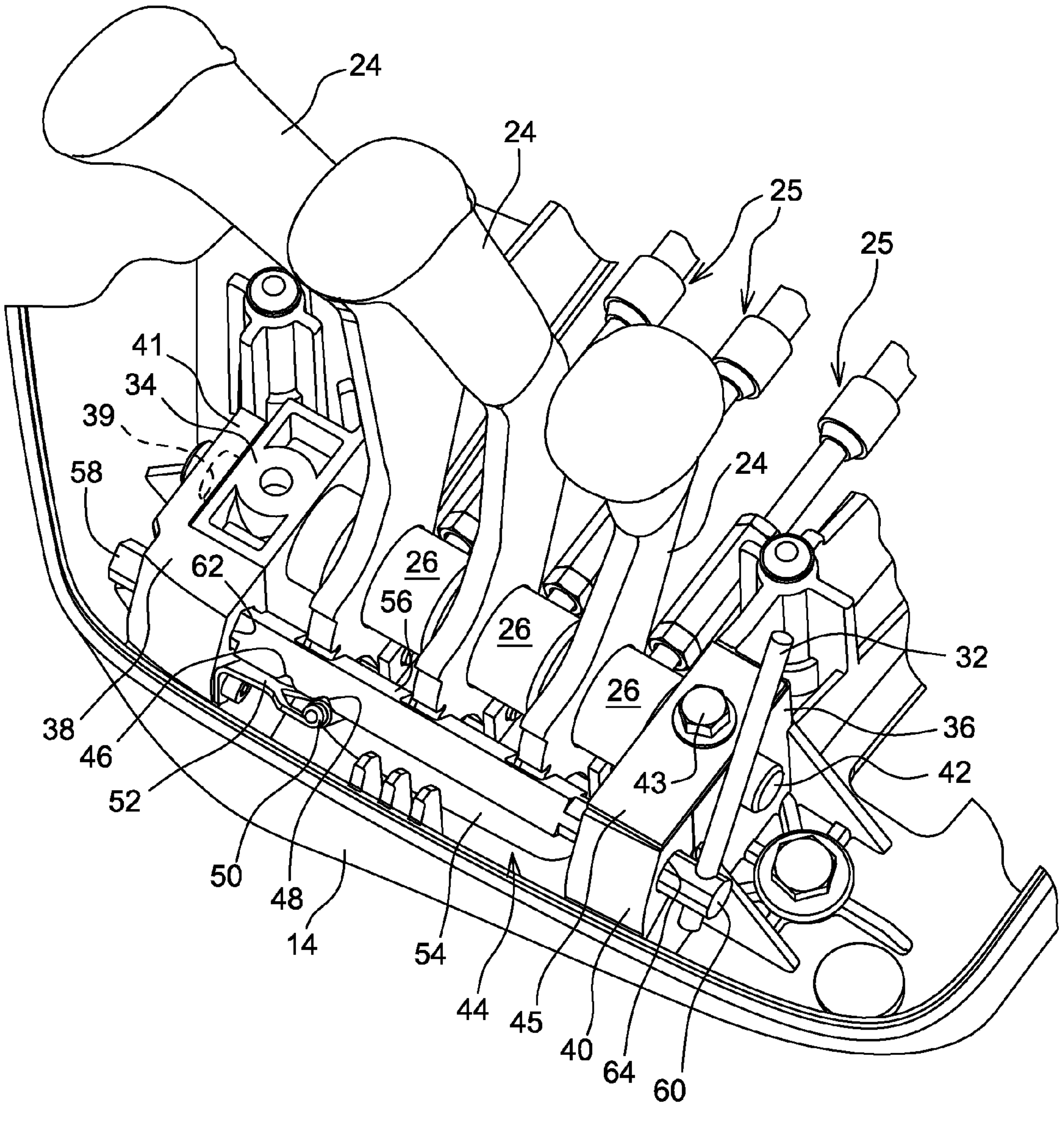
FIG. 2 is a top perspective of the control console of FIG. 1 with the cover removed.

As best seen in FIG. 2, a pair of shaft support blocks 34, 36 are mounted on the base, as are a pair of slide support blocks 38, 40. A lever shaft 42 has opposite ends received in bores in the support blocks 34 and 36. Shaft 42 is retained in the blocks 34 and 36 by retaining bolt 43 which is screwed into the threaded bore in the shaft 42. Each lever 24 includes a hub 26 which is independently rotatably mounted on the shaft 42 . A lockout slide member 44 is non-rotatably and slidably supported by slide support blocks 38 and 40. Slide member 44 includes a pair of detent recesses 46 and 48. A detent roller 50 is mounted at an end of a bracket arm or spring-arm 52 which is attached to a side of slide support 38. Detent roller 50 is releasably received by the detent recess 46 and 48 to releasably hold the slide member 44 in a lockout position and in an unlocked position.

The outboard block 38 is retained to the lower cover or floor 14 using a hole 39 in a wall 41 of the block 38 through which the lever mounting shaft 42 is inserted. When the block 38 is mounted into the floor 14 and the shaft 42 inserted, the block 38 is retained to the assembly 10. The outer block 38 contains a through hole or bore 62 with a non-circular or polygonal shape. The mating shape is on the outboard end 58 of the lockout slide 44. With the outboard block 38 locked into position and the end 58 inserted through the bore 62, the lockout slide is not allowed to rotate relative to the block 38 and floor 14. The lockout slide is free to slide move inboard and outboard along the centerline of the hole bore in the outboard block 38.

The inboard block 40 has a round bore 64 which receives the inboard end 60 of the lockout slide 44. When the inboard and outboard blocks 38, 40 are mounted to the floor 14, the center line of the bores 62 and 64 are aligned to each other. This is the centerline that the lockout slide 44 moves along as the lock is engaged and disengaged. The inboard block 40 is locked into position with a plate 45 mounted to shaft 42 by mounting bolt or screw 43.

Figure 3:
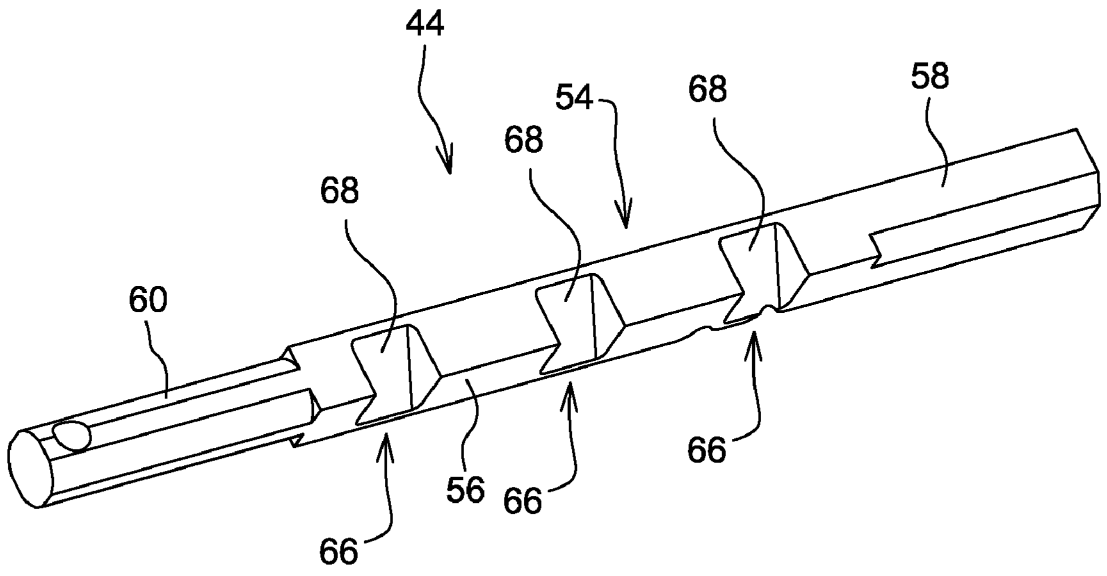
FIG. 3 is a perspective view of the lockout slide of FIG. 2.
Figure 4:
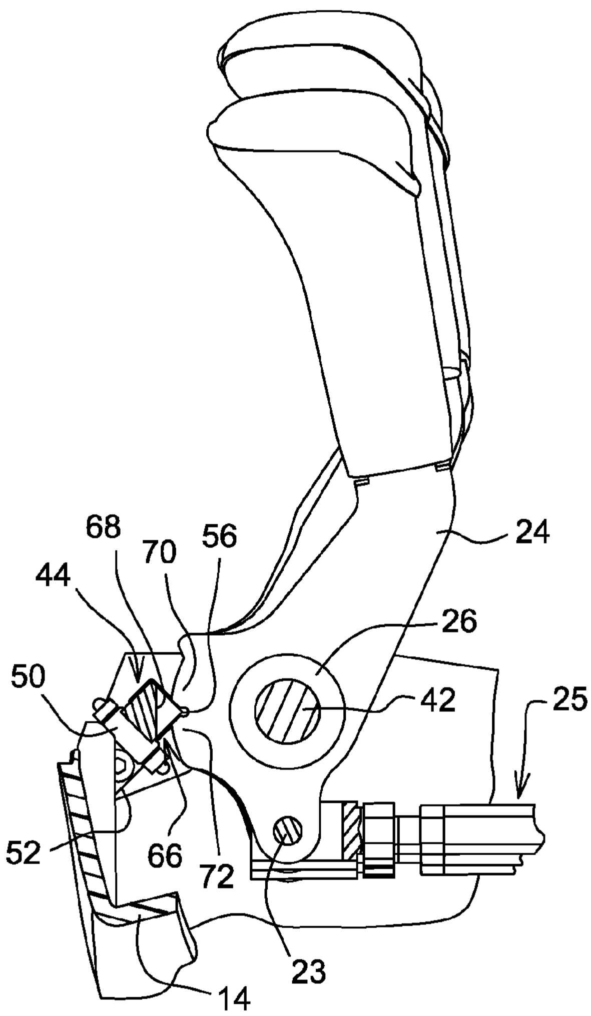
FIG. 4 is a detailed sectional view showing the lockout slide in an unlocked position.

As best seen in FIGS. 2-5, the portion 54 of slide member 44 between support blocks 38 and 40 has a non-circular, polygonal and preferably rectangular or square cross-sectional shape which forms a corner or edge 56 which is oriented towards the shaft 42. A bore through end 60 receives handle 32. As best seen in FIGS. 3-4, the slide member 44 includes cutouts or notches 66 which form bottom surfaces 68 which face towards the shaft 42. The centerline of each notch 66 is aligned to the rotational center of the corresponding lever 24 about the mounting shaft 42.

Figure 5:
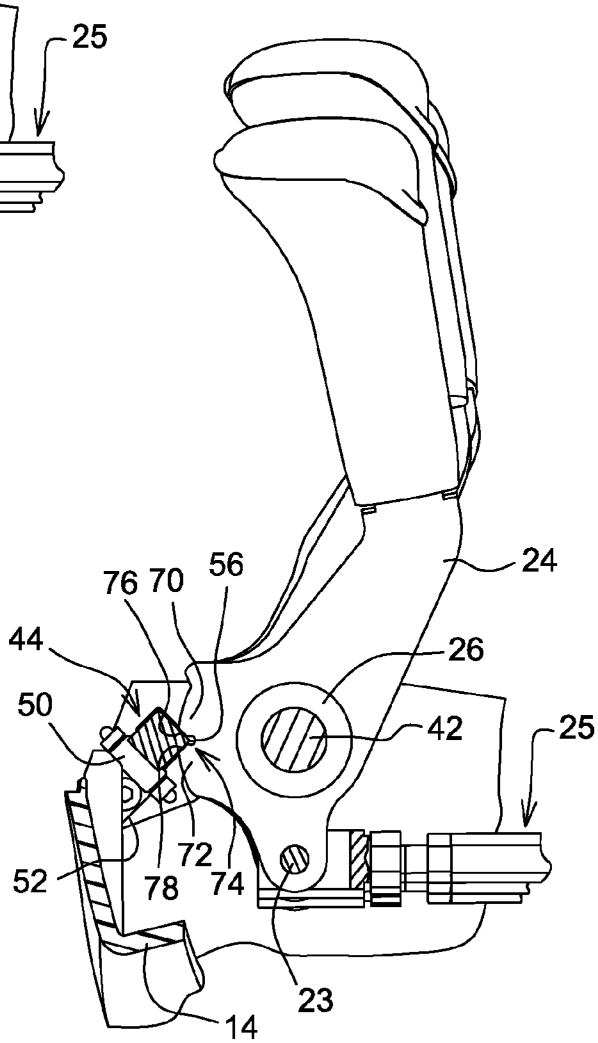
FIG. 5 is a detailed sectional view showing the lockout slide in a lockout position.

As best seen in FIGS. 4 and 5, a portion of the lever 24 forms a pair of arms 70 and 72 on either side of a notch 74. The arms 70 and 72 form generally inwardly facing surfaces or walls 76 and 78. When the slide member 44 is moved inboard (to the right in FIG. 2) to its lockout position, as best seen in FIG. 5, the walls 76 and 78 are engagable with the sides of ridge 56 to thereby prevent rotation or pivoting of the lever 24. Since the slide member's location and rotation are fixed relative to the lower cover 14, the levers 24 cannot be rotated on the shaft 42. The valves (not shown) controlled by levers 24 cannot be actuated with the slide member 44 in its lockout position, thus providing a lockout function. When the slide member 44 is moved outboard (to the left viewing FIG. 2) to its unlocked position, as best seen in FIGS. 2 and 4, the arms 70 and 72 are aligned with and received by the notches 66 and the slide member does not interfere with rotation or pivoting of the lever 24.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A lever lockout assembly, comprising:

a housing;

a lever support and a slide support mounted on the housing;

a lever member rotatably supported by the lever support, the lever member having a pair of arms separated by a notch formed in a surface thereof;

a lockout slide slidably supported by the slide support, the lockout slide being slidable with respect to the lever member, the lockout slide having a ridge portion and a recess portion, the ridge portion being adjacent to and projecting outwardly with respect to the recess portion, the lockout slide being slidable to a lockout position wherein the ridge portion is received by the notch and the ridge is engagable with the arms to prevent rotation of the lever member, and the lockout slide being slidable to an unlocked position wherein the recess portion is aligned with the notch and the arms are rotatable through the recess portion;

a handle projects from an end of the lockout slide; and the housing comprises a floor and a cover, the shaft support and the slide support being mounted on the floor, the cover having a lever slot through which extends the lever member, and the cover having a handle slot through which extends the handle.

2. The lever lockout assembly of claim 1, wherein:

the lockout slide comprises a rigid bar with a polygonal cross-sectional shape, an edge of the bar forming said ridge portion.

3. The lever lockout assembly of claim 1, wherein:

the lockout slide comprises a rigid bar with a rectangular cross-sectional shape, an edge of the bar forming said ridge portion.

4. The lever lockout assembly of claim 1, wherein:

the assembly comprises a plurality of lever members mounted on the lever shaft, each lever member having a pair of arms separated by a notch formed in a surface thereof; and the lockout slide having a corresponding plurality of ridge portions and recess portions.

5. The lever lockout assembly of claim 1, wherein:

the slide support and the lockout slide cooperate to prevent rotation of the lockout slide.

6. The lever lockout assembly of claim 1, wherein:

the lockout slide includes a detent recess formed in a surface thereof; and a detent member engages the lockout slide, the detent member being releasably received by the detent recess to releasably hold the lockout slide in a selected position.

7. The lever lockout assembly of claim 6, wherein:

the detent member comprises a roller member mounted at an end of a bracket arm, the bracket arm resiliently holding the roller member against the lockout slide.

8. A lever lockout assembly, comprising:

a housing;

a lever support and a slide support mounted on the housing, the slide support comprising a first support member and a second support member spaced apart therefrom, at least one of the support members having a polygonal aperture therein;

a lever member rotatably supported by the lever support, the lever member having a pair of arms separated by a notch formed in a surface thereof; and a lockout slide slidably supported by the slide support, the lockout slide being slid able with respect to the lever member, the lockout slide having a ridge portion and a recess portion, the ridge portion being adjacent to and projecting outwardly with respect to the recess portion, the lockout slide being slidable to a lockout position wherein the ridge portion is received by the notch and the ridge is engagable with the arms to prevent rotation of the lever member, and the lockout slide being slidable to an unlocked position wherein the recess portion is aligned with the notch and the arms are rotatable through the recess portion, the slide support and the lockout slide cooperate to prevent rotation of the lockout slide. the lockout slide having at least one end with a polygonal outer peripheral shape which conforms to the aperture, said end being received by said aperture and cooperating therewith to prevent rotation of the lockout slide.

9. A lever lockout assembly, comprising:

a lever support;

a slide support;

a lever member supported by the lever support for rotation about a lever axis;

a lockout slide member slidably supported by the slide support, the lockout slide member being slidable in directions parallel to the lever axis, one of the lever and lockout slide members having a projection, and the other of the lever and lockout slide members having a pair of arms, the lockout slide member being slidable to a lockout position wherein the projection is received between the arms and is engagable with the arms to prevent rotation of the lever member, and the slide member being slidable to an unlocked position wherein the projection is mis-aligned from the arms so that the lever member is rotatable without interference from the lockout slide member;

a housing having a floor and a cover, the lever support and the slide support being mounted on the floor, the cover having a lever slot and a handle slot formed therein; and a handle projecting from an end of the lockout slide member, the lever member extending through the lever slot, and the handle extending through the handle slot.

10. A lever lockout assembly, comprising:

a lever support;

a slide support, the slide support comprising a first support member and a second support member spaced apart therefrom, at least one of the first and second support members having a polygonal-shaped aperture therein; a lever member supported by the lever support for rotation about a lever axis; and a lockout slide member slidably supported by the slide support, the lockout slide member being slidable in directions parallel to the lever axis, one of the lever and lockout slide members having a projection, and the other of the lever and lockout slide members having a pair of arms, the lockout slide member being slidable to a lockout position wherein the projection is received between the arms and is engagable with the arms to prevent rotation of the lever member, and the slide member being slidable to an unlocked position wherein the projection is mis-aligned from the arms so that the lever member is rotatable without interference from the lockout slide member, the slide support and the lockout slide member cooperate to prevent rotation of the lockout slide member, the lockout slide member having at least one end with a polygonal outer peripheral shape which conforms to the aperture, said end being received by said aperture and cooperating therewith to prevent rotation of the lockout slide member.

11. A lever lockout assembly, comprising:

a housing;

a lever support and a slide support mounted on the housing;

a lever member rotatably supported by the lever support, the lever member having a pair of arms separated by a notch formed in a surface thereof;

a lockout slide slidably supported by the slide support, the lockout slide being slidable with respect to the lever member, the lockout slide having a ridge portion and a recess portion, the ridge portion being adjacent to and projecting outwardly with respect to the recess portion, the lockout slide being slidable to a lockout position wherein the ridge portion is received by the notch and the ridge is engagable with the arms to prevent rotation of the lever member, and the lockout slide being slidable to an unlocked position wherein the recess portion is aligned with the notch and the arms are rotatable through the recess portion, the lockout slide comprises a rigid bar with a polygonal cross-sectional shape, an edge of the bar forming said ridge portion.

12. The lever lockout assembly of claim 11, wherein:

the lockout slide member includes a detent recess formed in a surface thereof; and a detent member engages the lockout slide member, the detent member being releasably received by the detent recess to releasably hold the lockout slide member in a selected position.

13. The lever lockout assembly of claim 12, wherein:

the detent member comprises a roller member mounted at an end of a bracket arm, the bracket arm resiliently holding the roller member against the lockout slide member.

14. The lever lockout assembly of claim 13, wherein:

the bracket arm is attached to the slide support.

* * * * *